(12) United States Patent
Jarosinski

(10) Patent No.: US 7,661,009 B2
(45) Date of Patent: Feb. 9, 2010

(54) APPARATUS AND METHODS FOR DISCRIMINATING LATE SOFTWARE COMMANDS SENT TO HARDWARE

(75) Inventor: Tadeusz Jarosinski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 11/398,061

(22) Filed: Apr. 4, 2006

(65) Prior Publication Data

US 2007/0271571 A1    Nov. 22, 2007

(51) Int. Cl.
G06F 1/00 (2006.01)
G06F 1/14 (2006.01)
G06F 19/00 (2006.01)

(52) U.S. Cl. .................. 713/500; 713/501; 713/502; 702/31; 702/32; 702/35; 702/79; 702/189

(58) Field of Classification Search .............. 713/500, 713/501, 502, 600, 601; 702/31, 32, 35, 702/79, 189
See application file for complete search history.

(56) References Cited

U.S. PATENT DOCUMENTS

| | | | |
|---|---|---|---|
| 4,393,446 A | | 7/1983 | Gurr et al. |
| 5,708,817 A | * | 1/1998 | Ng et al. .................. 710/266 |
| 6,125,404 A | | 9/2000 | Vaglica et al. |
| 7,142,990 B2 | * | 11/2006 | Bouse et al. .................. 702/35 |
| 7,239,996 B2 | * | 7/2007 | Boland et al. ................. 703/19 |

FOREIGN PATENT DOCUMENTS

EP        0 959 575 A1     11/1999

OTHER PUBLICATIONS

Network Working Group, J. Postel: "Internet Control Message Protocol, DARPA Internet Program Protocol Specification", [online] Sep. 1981, XP002453712.
International Search Report - PCT/US07/066008, International Search Authority - European Patent Office - Oct. 25, 2007.
Written Opinion-PCT/US07/066008, International Search Authority-European Patent Office-Oct. 25, 2007.

* cited by examiner

*Primary Examiner*—Thomas Lee
*Assistant Examiner*—Michael J Brown
(74) *Attorney, Agent, or Firm*—Gerald P. Joyce, III

(57) ABSTRACT

Apparatus and methods for discriminating late software commands sent to hardware from software executed by a processor. The apparatus, in particular, includes a storage device configured to receive information concerning a timing requirement for software commands transmitted from a microprocessor, where the timing requirement is dependent on a system time. A time counter is also included and configured to determine the system time. The apparatus further includes a comparator configured to determine whether the timing requirement has been met, and a switching circuit configured to selectively allow the software command to be issued from the processor to a hardware circuit based on the determination of whether the timing requirement has been met. Complementary methods are also disclosed.

27 Claims, 5 Drawing Sheets

APPARATUS AND METHODS FOR DISCRIMINATING LATE SOFTWARE COMMANDS SENT TO HARDWARE

BACKGROUND

1. Field

The present application relates to apparatus and methods for discriminating (e.g., filtering out) late software commands sent to hardware and, more particularly, to discriminating late software commands so as to prevent the late software commands from disrupting hardware circuitry operation.

2. Background

In many applications involving real-time software processing, hardware is responsible for executing certain operations at precise times specified by software, while software is responsible for complex synchronous processing. Synchronization between software and hardware is typically maintained through interrupts, which signal certain events to software. Software then computes and writes values to hardware registers that need to be updated at certain points in time. As the complexity of real-time software increases, however, it becomes more difficult to estimate the time that software will take to respond to real-time events, such as interrupts from hardware. As a result, it is known to add safety margin time (i.e., padding) to a nominal theoretical time that software can respond to real-time events with a given probability. An example of such a situation where adding safety margins is known, is that of a wireless communication device (e.g., a mobile transceiver) having sleep controller hardware that causes portions of the device to be put to sleep intermittently (i.e., temporarily shutting down circuitry within the transceiver) in order to conserve battery energy. Typically, conservative safety margins are factored in the software and hardware designs of such devices, which reduces the probability of late software commands (i.e., commands issued by software that adversely affect operation of the hardware due to their later timing in a sleep cycle, for example) in such devices to an acceptable level. However, the devices use more energy and run out of power quicker as a consequence of adding the safety margins. Moreover, this approach does not completely eliminate the possibility of disruptive late software commands, but merely reduces their probability to a tolerable level.

In certain applications, better performance may be engendered if late software commands are not executed at all because such late commands are disruptive to the hardware operation to a degree that adversely affects system performance. In such situations, it is possible to minimize the time of the software timely response confidence interval at the expense of a higher percentage of late software commands being ignored by hardware, if such commands being ignored prove statistically insignificant. An example of such a situation may be envisioned in the case of the wireless communication device (e.g., a mobile transceiver) having a sleep controller as discussed above. In such a case, the time of a software timely response confidence interval may be minimized in the sleep controller hardware and software in the wireless communication device (e.g., a mobile transceiver). The device would be allowed to stay turned on in the case where software misses the deadline of writing to registers, rather than lose part of the received communication signals if woken up late.

SUMMARY

According to an aspect of the present disclosure, an apparatus for discriminating software commands sent to hardware is disclosed. The apparatus includes a storage device configured to receive information concerning a timing requirement for at least one software command transmitted from a processor, the timing requirement dependent on a system time. The apparatus further includes a time counter configured to determine the system time; a comparator configured to determine whether the timing requirement has been met. Finally, the apparatus features a switching circuit configured to selectively allow the software command to be issued from the processor to a hardware circuit based on the determination of whether the timing requirement has been met.

According to another aspect of the present disclosure, a transceiver is disclosed featuring a processor and hardware circuitry configured to operate synchronously with processor. The transceiver further includes a discriminator apparatus for selectively allowing software commands to be transmitted by processor to the hardware circuitry based on a timing requirement.

According to yet another aspect of the present disclosure, a method for synchronously transmitting software commands from a processor to a hardware circuit is disclosed. In particular, the method features receiving information concerning a timing requirement for a software command from the processor where the timing requirement is dependent on a system time, determining a system time, determining whether the timing requirement has been met based on the system time, and then selectively allowing transmission of the software command from the processor to the hardware circuit if the timing requirement has been met.

According to still another aspect of the present disclosure, an apparatus is disclosed that includes means for storing a timing requirement from software running on a processor. The apparatus also includes means for receiving a system time and means for determining whether the timing requirement is met based on the system time. Furthermore, means for selectively allowing a software command to be transmitted from the processor to a hardware circuit based on whether the timing requirement has been met are included.

According to yet one more aspect of the present disclosure, a computer-readable medium encoded with a set of instructions is disclosed. The instructions include an instruction for receiving information concerning a timing requirement for a software command from the processor where the timing requirement is dependent on a system time; an instruction for determining a system time; an instruction for determining whether the timing requirement has been met based on the system time; and an instruction for selectively allowing transmission of the software command from the processor to the hardware circuit when the timing requirement has been met.

BRIEF DESCRIPTION OF THE DRAWINGS

It is noted that like numerals refer to like parts throughout the several views of the drawings.

DETAILED DESCRIPTION

Apparatus and methods for discriminating software commands sent to hardware. More particularly, the discrimination effected prevents late software commands from inadvertently disrupting hardware operation are disclosed where software is used to define timing information or criteria, such as the latest system time at which a software command will be accepted by hardware. The timing information is stored in a discriminator unit, which also tracks the system time. The discriminator may then determine or "discriminate" whether a received software command is on time or is late based on comparison of the stored timing information or criteria with the tracked system time. If the software command is late, the discriminator acts to block or gate the software command such that it is not allowed to be sent to hardware. Accordingly, late software commands are prevented from disrupting hardware operation.

Figure 1:
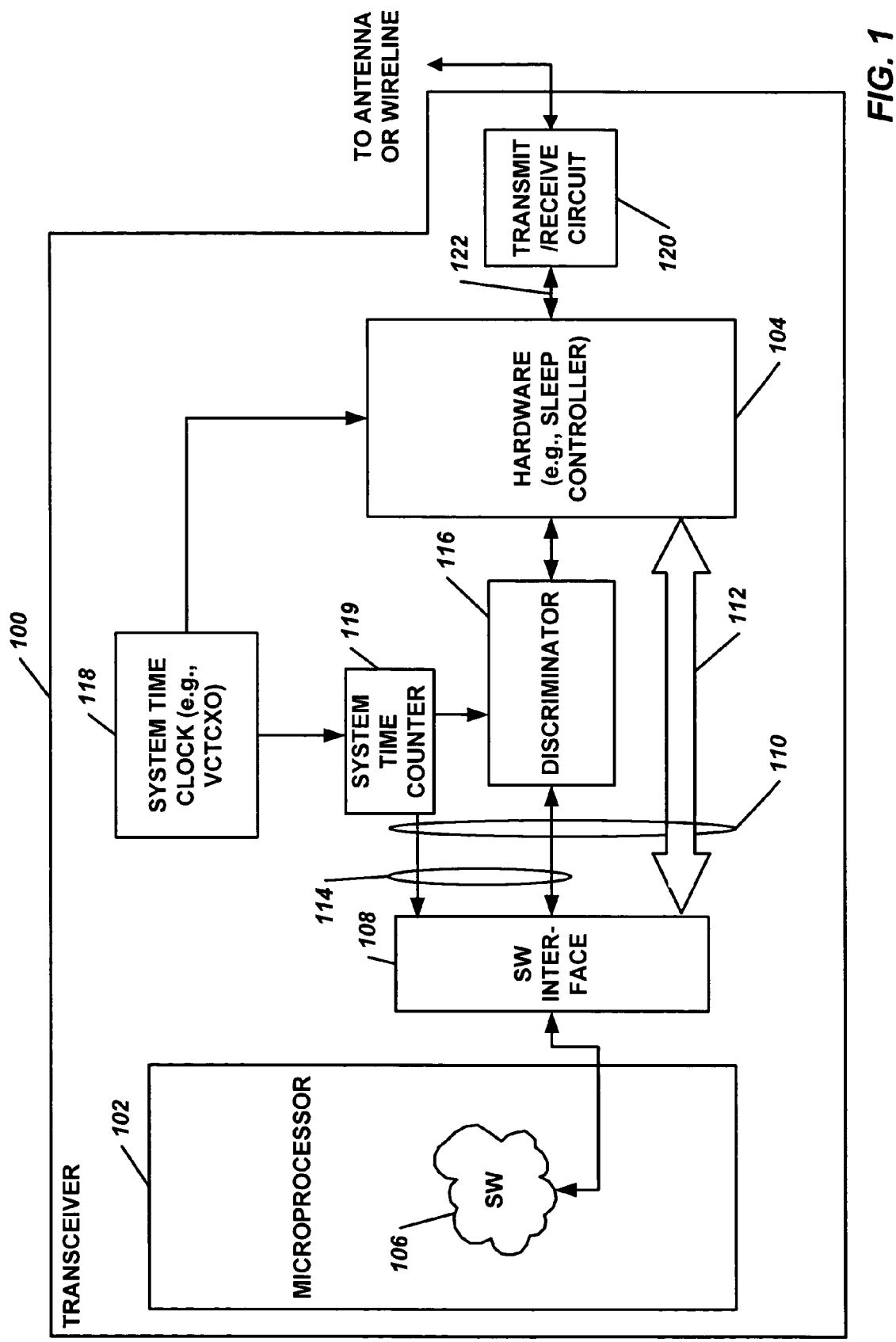
FIG. 1 is a block diagram of an exemplary transceiver employing a discriminator for discriminating software commands issued to a hardware circuit.

FIG. 1 illustrates a block diagram of an exemplary transceiver employing a discriminator for discriminating software commands sent to a hardware circuit. In particular, the transceiver 100 includes a microprocessor 102, such as a general purpose processor (GPP), or any other similar device. The transceiver 100 also includes hardware circuitry 104. The hardware 104 may be circuitry such as a sleep controller, as an example, which is used to control sleep modes in the transceiver 100 where portions of the components in the transceiver 100 are shut down to conserve power. The microprocessor 102 is configured to execute software illustrated by cloud 106, which may include software that is run in real-time. As will be explained below, hardware 104 interfaces with the microprocessor 102 and is configured to execute particular operations or commands during a precise timing window, the end of which is specified by the software 106. An example of this operation includes the microprocessor 102 issuing software commands to hardware 104 in response to requests or interrupts from the system time counter 119.

In the example of FIG. 1, the software 106 running on microprocessor 102 interfaces with the hardware 104 through a software interface 108 and a bus 110 between the software interface 108 and the hardware 104. The bus 110 includes a bus interface 112, which may be used to transmit communication data received from the hardware 104 to the microprocessor 102 or, also to transmit data (e.g., communication to be transmitted by the transceiver 100) from the microprocessor 102 to the hardware 104. Additionally, the interface 110, which includes the bus interface 112 as well as another bus interface 114, may transmit hardware commands from the software 106 to hardware 104 as well as transmit interrupts from hardware to software. Bus interface 114, in particular, includes a discriminator 116 that is used to selectively control transmission of software commands from software interface 108 to hardware 104 based on predetermined criteria, such as time criteria. More particularly, software commands that are selectively passed from software to hardware via the discriminator and bus 114 are those software commands that may be ignored by hardware since these are typically those commands that are statistically insignificant. Furthermore, if these particular software commands are executed late by hardware 104, this will degrade the performance of hardware 104. Thus, it is better not to execute the software commands at all rather than execute them late.

As further shown in FIG. 1 a system time clock 118, which may be, for example, a voltage controlled temperature compensated crystal oscillator (VCTCXO) or a similar timing source is included. The system time is fed to a system time counter 119, which is used in conjunction with the issue of synchronous requests or interrupts to the software interface 108, such as via interface 114, in order to effect synchronization of hardware with software. The system time counter 119 also provides a count of the system time to the discriminator 116 as a time reference for use in discriminating if software commands are late or not.

As further illustrated in FIG. 1, the transceiver 100 also includes a transmit/receive circuit 120 that serves to transmit and receive communication signals via an antenna or wireline. The transmit/receive circuit 120 may be an RF tuner in the case of wireless communication, for example, or any other suitable transmit or receive circuitry for wireless or wireline communications. The transmit/receive circuit 120 interfaces with the hardware 104 via an interface 122, which transmits both communication signals as well as control signals (i.e., hardware requests or software commands).

Figure 2:
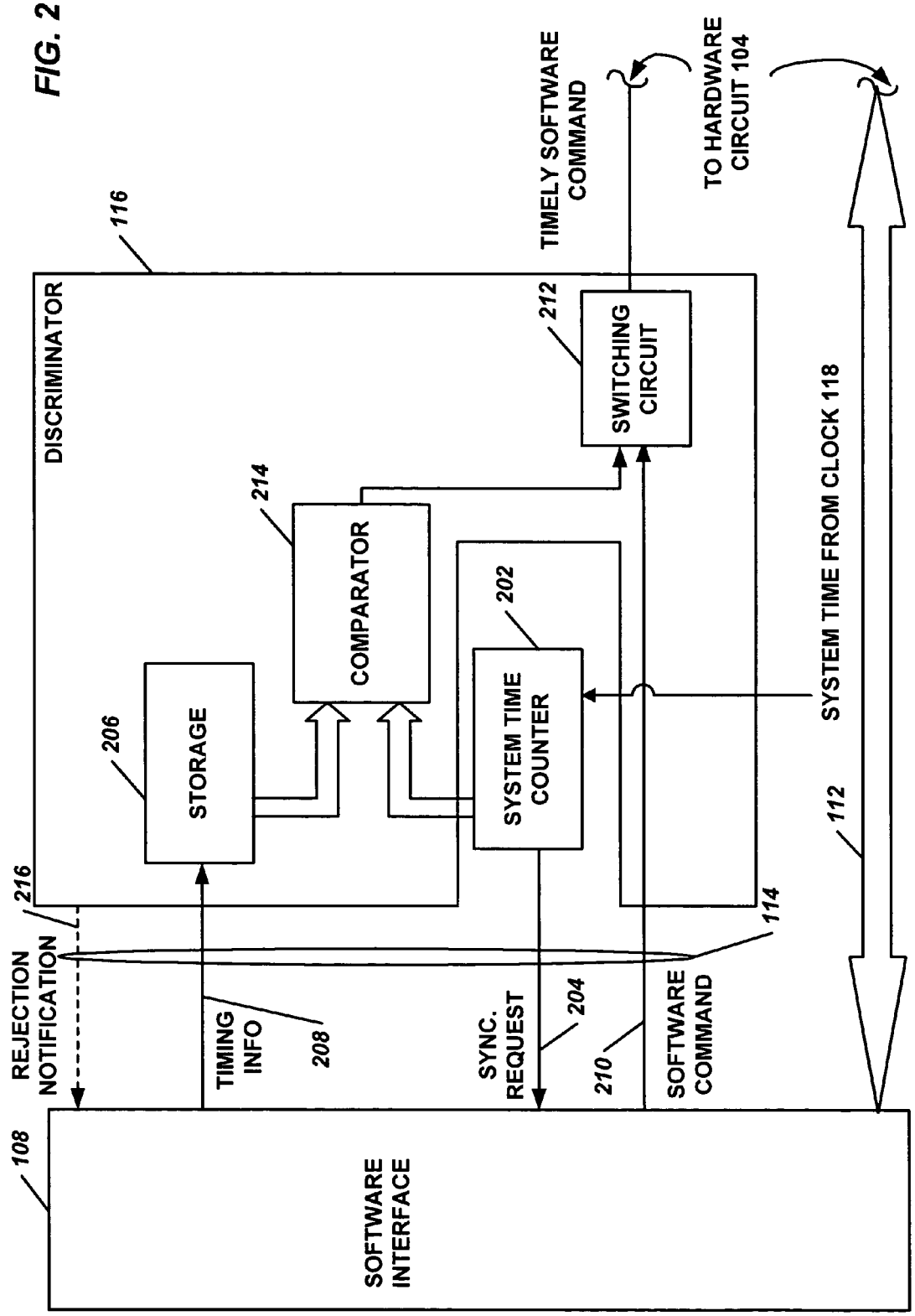
FIG. 2 is a block diagram of an example of a discriminator that may be used in the transceiver of FIG. 1.

FIG. 2 is a block diagram of an example of a discriminator that may be used with the transceiver 100 of FIG. 1. As mentioned previously, the discriminator 116 serves selectively control or "gate" the delivery of one or more software commands from software 106 to hardware 104 in order to mitigate disruption of hardware 104 operation. The transceiver 100 shown in FIG. 2 includes a system time counter 202, which tracks the system time based on the system time from clock 118, for example. It is noted that the system time counter 202 is typically found in known wireless transceiver devices and such existing time counters may be utilized in the disclosed system. The system time counter 202 is configured also to send a sync interrupt signal 204 to the software interface 108 to trigger particular timing events, as will be discussed later.

Discriminator 116 also includes a storage device 206, such as a memory or a register to which the software 106 may write via software interface 108 particular determined timing information 208 as an example, the timing information 208 may include a latest time setting for which a software command, which is received from interface 108 may be executed or allowed to pass to the hardware circuit 104.

FIG. 2 also illustrates one or more exemplary software commands 210 from software interface 108, which are transmitted over the interface 114 to discriminator 116. Software command 210 is delivered to a switching circuit 212, which will be discussed below. The discriminator 116 also includes a comparator circuit 214. The comparator 214 receives information from the system time counter 202 a storage device 206 and, based on the input information, discriminates or compares the timing information stored by software in storage 206 with the present system or event time as kept by counter 202.

In operation, if the comparator 214 determines that the present system time is prior to or equal to the timing information stored in storage 206, the comparator 214 signals the switching circuit 212 to remain allowing software commands 210 to be passed through to the hardware circuit 104. If the present system time as determined by counter 202 exceeds the latest time or timing information stored in storage unit 206, the comparator 214 then signals switching circuit 212 to lock out or prevent software command 210 from passing through to the hardware circuit 104. Thus, the discriminator 116 serves to prevent late software commands from being executed by the hardware 104 and thereby avoids deleterious disruption of the hardware 104.

It is noted that the synchronization request or interrupt 204 may be triggered by various communications signal information received by the transceiver 100. For example, the synchronization interrupt 204 may be tied to a sync channel in a CDMA communications system, a received symbol or frame, such as in an OFDMA system, a burst in various burst communication systems, or other information in other communication systems and protocols. Typically, in response to the sync interrupt 204, the software 106 will be synchronized and respond with a software command to hardware 104. Various ones of the software commands, such as software command 210, which is normally statistically insignificant for operation of the hardware circuit 104, are then gated by switching circuit 212 in order to ensure that when the software 106 responds with a late software command that this late command is prevented from reaching the hardware 104 in order to prevent disruption of the hardware operation. As an example of a statistically insignificant software command, typically in transceiver devices sleep controllers are used to shut down various circuits and processes within a transceiver or receiver in order to save battery power. The initiation of events effected or carried out by the hardware sleep controller is based on software commands from the software 106. If a late software command effecting operation of certain sleep modes or sleep mode operations is received late, it is statistically insignificant if the command is ignored and those sleep modes are not executed because simply foregoing power savings while not adversely disrupting hardware operation outweighs the benefit of saving battery energy with the potential disruption of the hardware circuitry 104.

Of further note, FIG. 2 also illustrates an alternative example where the discriminator 116 transmits a reject notification signal 216 to the software via interface 108. This signal 216 communicates to the software that the discriminator 116 has prevented transmission of one or more of the software commands 210 to hardware circuit 104 whenever the discriminator 116 rejects late commands.

Figure 3:
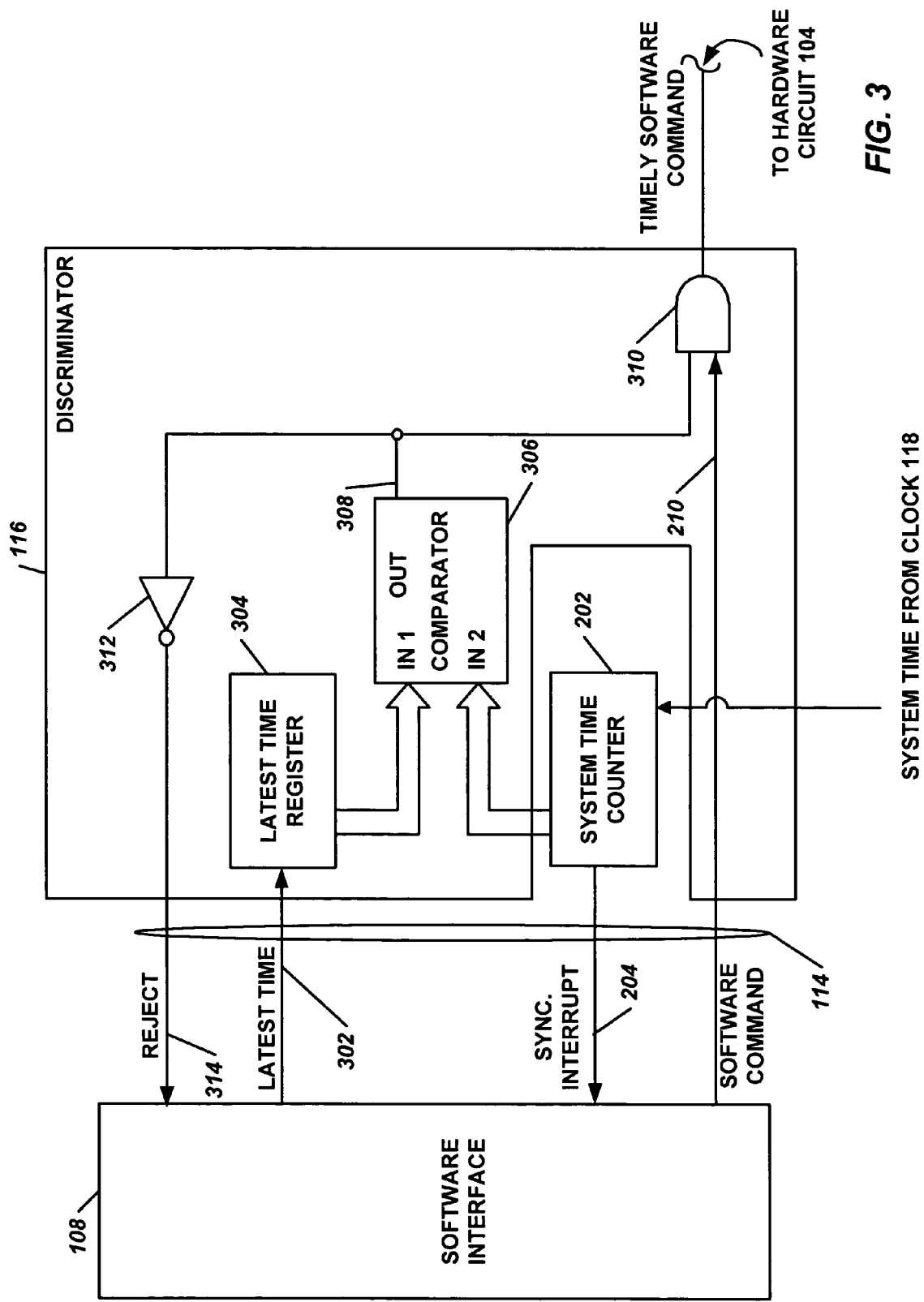
FIG. 3 is a block diagram of a further example of a discriminator that may be used in the transceiver of FIG. 1.

FIG. 3 illustrates another exemplary implementation of the discriminator 116, which may be used with the transceiver 100 illustrated in FIG. 1. In this example, the software interface 108 is used by software 106 to write a latest time to a latest time register 304 via an interface 302, which may be part of interface 114. The latest time register 304, in turn, inputs the latest time stored therein to an input IN 1 of a comparator 306. System time counter 202 inputs the current system time to a second input IN 2 of the comparator 306. When the value of the latest time is greater than or equal to the system time input at input IN 2, the output 308 of the comparator 306 is set to a predetermined value, such as a binary value of one (1), which is delivered to an input of an AND gate 310. It is noted that if the logic used to gate the software command 210 is different from the illustrated AND gate 310, the output of the comparator would be set to whatever value that would correspond to allowing the software command to be passed to hardware if the system time has not exceeded the latest time.

In the example of FIG. 3, when the system time input by counter 202 to input IN 2 of comparator 306 is greater than the latest time stored in register 304, the output of the comparator 306 changes state, such as from a binary value one (1) to a binary value zero (0), such as in the particular example where an AND gate 310 is used. Accordingly, when the output of the comparator 308 is set to a binary value of zero, the AND gate 310 will no longer allow the software command 210 to be output to the hardware circuit 104.

As further illustrated, the example of FIG. 3 also includes reject signal circuitry, such as an inverter or buffer 312, which is used to relay a "reject decision" signal back to the software via software interface 108, as indicated by signal 314. This signal 314 informs the software that the software command was late and was not allowed to pass to the hardware circuit 104. In this particular example, when the comparator 306 has an output 308 of binary value zero, the inverter 312 inverts the binary value of zero to a binary pulse of value one in order to issue the reject or comprise the reject 314. As illustrated, each of the sync interrupt signal 204, the software command 210, the latest time value 302, and the reject signal 314 may be transmitted over the interface 114, or may alternatively be bussed separately or in different groupings.

It is further noted that the discriminator 116 may be implemented within a baseband transceiver or receiver and not as discrete unit as illustrated if FIGS. 1-3. Alternatively, the components of the discriminator 116 may also be implemented as part of another baseband chip within the transceiver 100, such as a baseband chip employing microprocessor 102. Furthermore, various components used to effect the operation of discriminator 116 may be split between a baseband chip employing the general purpose processor and a baseband chip for a particular transceiver or receiver such as for CDMA or OFDMA baseband chips.

Figure 4:
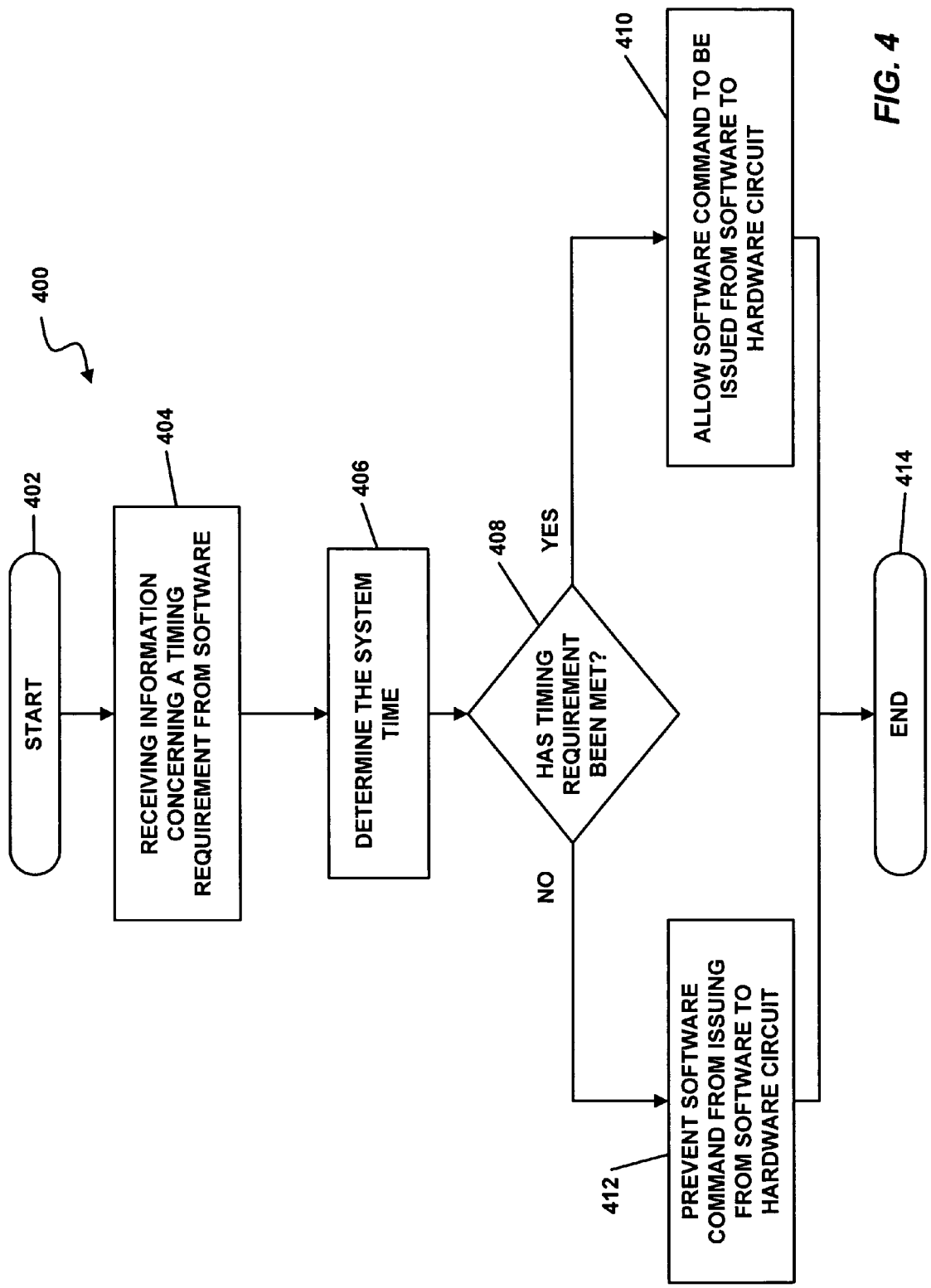
FIG. 4 is a flow diagram of an exemplary method for discriminating software commands sent to a hardware circuit.

FIG. 4 is a flow diagram of an exemplary method for discriminating software commands sent to a hardware circuit. For example, the discriminator 116 as disclosed in FIGS. 1-3 could perform a process or method 400 illustrated in FIG. 4. As shown in FIG. 4 the process or method 400 begins at a start block 402 and proceeds to block 404. At block 404, information concerning a timing requirement is received from software. In the implementation of FIGS. 1-3, this may be implemented by the writing of timing information from the software 106 to the storage 206 or the latest time register 304. As a further example, the timing requirement information may be a latest time at which a software command may be passed from software to hardware as discussed previously in connection with FIG. 3.

As mentioned above, the components of the discriminator 116 may be implemented as a discrete unit as illustrated in FIGS. 1-3 or as part of another chipset, or divided between multiple chipsets. Additionally, the functionality of discriminator 116 may be implemented with hardware, firmware, software stored in a memory device and executable by a processor, or combinations of hardware, software, or firmware.

After block 404, flow proceeds to block 406 where the system time is determined. As an example of an implementation of this process, the system time counter 202 of FIGS. 2 and 3 may be used to implement this by tracking a current system time from clock 118 such as with a counter. After the system time is determined to block 406, flow proceeds to decision block 408 where a determination is made whether the timing requirement has been met. For example, if the timing requirement is the latest time as discussed in the example of FIG. 3, this part of process 400 may be implemented by the comparator 306, which compares the system time with the latest time information. If, at block 408, the timing requirement has been met, flow proceeds to block 410 where the software command is allowed to issue from software to the hardware circuit. For example, the switching circuit 212 or gating logic 310 may implement this part of process 400, where if a latest time for a software command has not been exceeded, the switching unit or gating logic (e.g., 212 or 310) continues to allow software commands to be passed from software to hardware.

Alternatively at block 408, if the timing requirement has not been met (i.e., the command is late), flow proceeds to block 412 where the software commands are prevented from issuing from software 106 to hardware circuitry 104. This part of process 400 may be implemented also by the gating logic where if the comparator output changes due to the system time exceeding the latest time stored, the gating logic prevents software commands from being passed to hardware circuit 104.

After either blocks 410 or 412, flow proceeds to the termination block 414. It is noted, however, that the comparator continuously compares the stored timing requirement information with the present system time. Accordingly, after the processes of block 410 or 412, flow may loop back to block 404 (not shown) for continuous determination of system time and comparison or discrimination to determine whether the timing requirement has been met during, for example, a sleep mode cycle. Only after the sleep mode cycle is complete, in this example, would the process 400 terminate and begin again during a subsequent sleep mode cycle.

Figure 5:
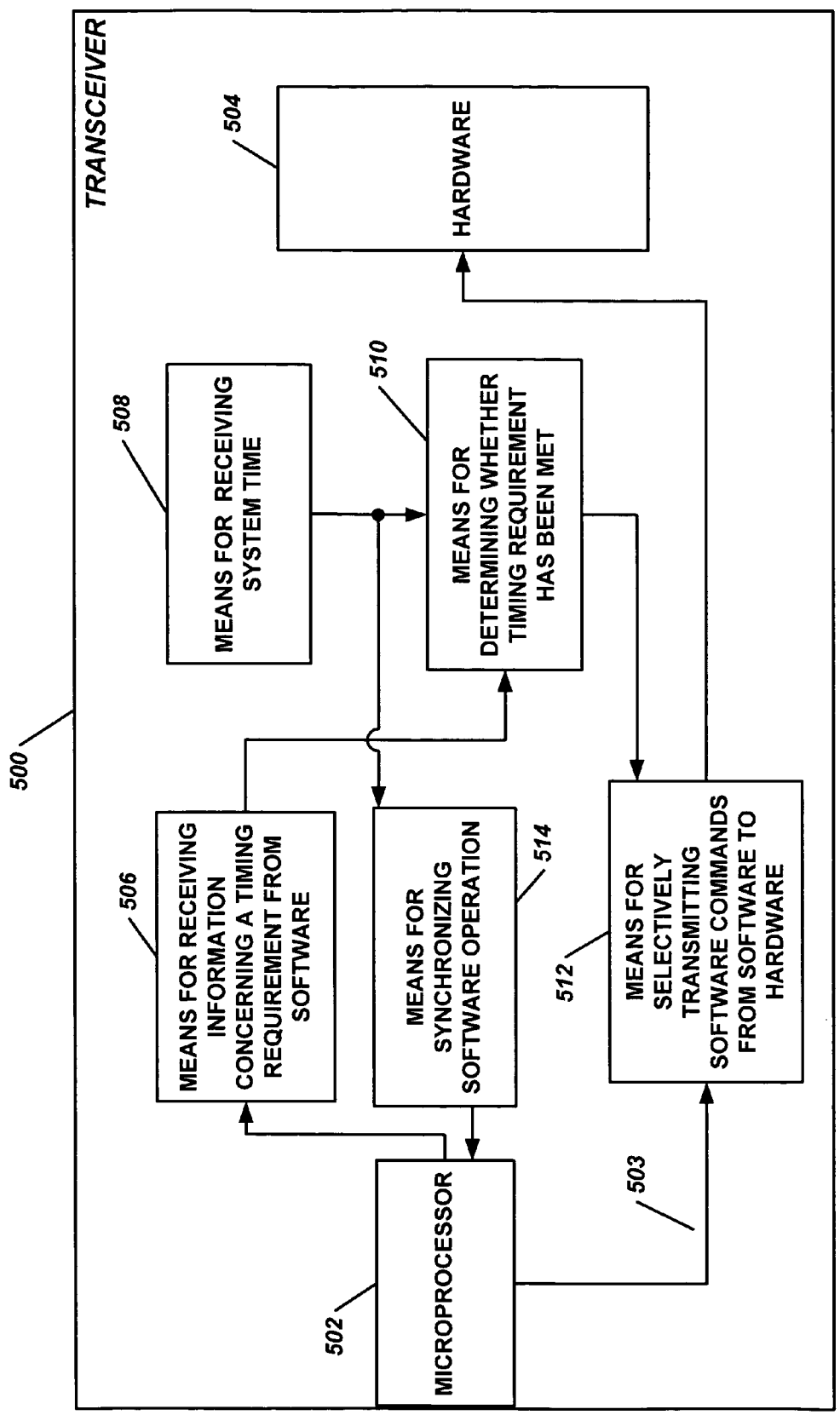
FIG. 5 is a block diagram of a further exemplary transceiver employing a discriminator for discriminating software commands sent to a hardware circuit.

FIG. 5 illustrates another exemplary transceiver 500 employing an apparatus for discriminating software commands between software and hardware. As shown, the transceiver includes a processor, such as a microprocessor 502, which outputs software commands 503 for control of certain operations to be performed by a hardware circuitry 504. The processor 502 also is configured to calculate timing requirement information, such as a latest time at which a software command may be transmitted from the processor 502 to the hardware 504. This timing requirement information is communicated to a means 506 for receiving information concerning the timing requirement from the software run by processor 502. Means 506 may be implemented, for example, by storage 206 or register 304 as disclosed in the examples of FIGS. 2 and 3, respectively. Transceiver 500 also includes means for receiving system time 508. Means 508 may be implemented by the system time counter 202 discussed above in connection with FIGS. 2 and 3, as an example. Additionally, means 514 for synchronizing software operation is included. Means 514 uses system time information from means 508 to generate timing events that are received by microprocessor 502 for the hardware-software synchronization purposes. This means 514 may be implemented by, for example, a device such as system time counter 119 or 202, discussed above, Each of means 506 and 508 respectively output the stored timing requirement and the system time to means 510. Means 510 is a means for determining whether timing requirement has been met based on the input information. Means 510 may be implemented by comparator 214 shown in FIG. 2 or comparator 306 shown in FIG. 3, as examples. The determination made by means 510 is output to a means 512 for selectively transmitting software commands from software to hardware, which is located between the processor 502 and the hardware circuitry 504 as illustrated in FIG. 5. Means 510 may be implemented by switching circuit 212 or gating logic 310 illustrated in FIGS. 2 and 3, respectively.

The methods or algorithms described in connection with the examples disclosed herein may be embodied directly in hardware, in a software module executed by a processor, firmware, or in a combination of two or more of these. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. The word "exemplary" is used exclusively herein to mean "serving as an example, instance, or illustration." Any example described herein as "exemplary" is not necessarily to be construed as preferred or advantageous over other examples. Accordingly, the novel aspects described herein is to be defined solely by the scope of the following claims.

What is claimed is:

1. An apparatus for discriminating software commands sent to hardware comprising:
    a storage device configured to receive information concerning a timing requirement for at least one software command transmitted from a processor, the timing requirement dependent on a system time;
    a time counter configured to determine the system time and issue a sync signal to an interface to trigger the software command;
    a comparator configured to determine whether the timing requirement has been met; and
    a switching circuit configured to receive the software command from the processor and configured to selectively allow the software command to be issued from the processor to a hardware circuit based on the determination of whether the timing requirement has been met.

2. The apparatus as defined in claim 1, wherein the timing requirement includes a latest system time at which the at least one software command may be transmitted from the processor to the hardware circuit.

3. The apparatus as defined in claim 2, wherein the discriminator comprises a comparator configured to compare the latest system time with the system time to determine whether the timing requirement has been met and output a comparison output based on the determination.

4. The apparatus as defined in claim 1, wherein the switching circuit comprises a logic gate configured to selectively allow the at least one software command to pass to hardware based on whether the timing requirement has been met.

5. The apparatus as defined in claim 1, wherein the time counter is further configured to transmit the sync signal to the processor to communicate synchronous timing information to software running on the processor.

6. The apparatus as defined in claim 1, further comprising reject signal circuitry configured to transmit a signal for communicating to the processor when the at least one software command has been prevented from issuing to the hardware circuit by the switching circuit.

7. The apparatus as defined in claim 1, wherein the apparatus is used in one of a wireless transceiver and a wireline transceiver.

8. A transceiver comprising:
a processor;
hardware circuitry configured to operate synchronously with the processor; and
an apparatus for selectively allowing software commands to be transmitted by the processor to the hardware circuitry based on a timing requirement,
wherein the apparatus for selectively allowing software commands to be transmitted by processor to the hardware circuitry based on the timing requirement further comprises:
a storage device configured to receive information concerning the timing requirement for at least one software command transmitted from the processor, the timing requirement dependent on a system time;
a time counter configured to determine the system time and issue a sync signal to an interface to trigger the software command;
a comparator configured to determine whether the timing requirement has been met; and
a switching circuit configured to receive the software command from the processor and configured to selectively allow the software command to be issued from the processor to the hardware circuit based on the determination of whether the timing requirement has been met.

9. The transceiver as defined in claim 8, wherein the timing requirement includes a latest system time at which the at least one software command may be transmitted from the processor to the hardware circuit.

10. The transceiver as defined in claim 9, wherein the discriminator comprises a comparator configured to compare the latest system time with the system time to determine whether the timing requirement has been met and output a comparison output based on the determination.

11. The transceiver as defined in claim 8, wherein the switching circuit comprises a logic gate configured to selectively allow the at least one software command to pass to hardware based on whether the timing requirement has been met.

12. The transceiver as defined in claim 8, wherein the time counter is farther configured to transmit the sync signal to the processor to communicate synchronous timing information to software running on the processor.

13. The transceiver as defined in claim 8, farther comprising reject signal circuitry configured to transmit a signal for communicating to the processor when the at least one software command has been prevented from issuing to the hardware circuit by the switching circuit.

14. The transceiver as defined in claim 8, wherein the transceiver is one of a wireless transceiver and a wireline transceiver.

15. A method for synchronously transmitting software commands from a processor to a hardware circuit, the method comprising:
receiving information concerning a timing requirement for a software command from the processor where the timing requirement is dependent on a system time;
determining the system time;
determining a sync signal from the system time;
coupling the sync signal to an interface to initiate the software command;
determining whether the timing requirement has been met based on the system time and the sync signal; and
selectively allowing transmission of the software command from the processor to the hardware circuit when the timing requirement has been met.

16. The method as defined in claim 15, wherein the timing requirement includes a latest system time at which the at least one software command may be transmitted from the processor to the hardware circuit.

17. The method as defined in claim 16, further comprising:
comparing the latest system time with the system time to determine whether the timing requirement has been met; and
outputting a comparison output based on the determination of whether the timing requirement has been met.

18. The method as defined in claim 15, wherein at least one sync signal is transmitted to the processor to communicate synchronous timing information to software running on the processor.

19. The method as defined in claim 15, further comprising:
transmitting a signal to the processor for communicating when the at least one software command has been prevented from issuing to the hardware circuit by the switching circuit.

20. The method as defined in claim 15, wherein the method is used in one of a wireless transceiver and a wireline transceiver.

21. An apparatus comprising:
means for storing a timing requirement from software running on a processor;
means for receiving a system time;
means for determining a sync signal from the system time and coupling the sync signal to an interface to initiate the software command;
means for determining whether the timing requirement is met based on the system time and the sync signal; and
means for selectively allowing a software command to be transmitted from the processor to a hardware circuit based on whether the timing requirement has been met.

22. The apparatus as defined in claim 21, wherein the timing requirement includes a latest system time at which the at least one software command may be transmitted from the processor to the hardware circuit.

23. The apparatus as defined in claim 22, wherein the means for determining is further configured to compare the latest system time with the system time to determine whether the timing requirement has been met and output a comparison output to the means for selectively allowing a software command to be transmitted based on the determination.

24. The apparatus as defined in claim 21, wherein the means for determining the sync signal is further configured to transmit the sync signal to the processor to communicate synchronous timing information to software running on the processor.

25. The apparatus as defined in claim 21, further comprising means for transmitting a reject signal to the processor that communicates that the at least one software command has been prevented from issuing to the hardware circuit by the means for selectively allowing a software command to be transmitted.

26. The apparatus as defined in claim 21, wherein the apparatus is one of a wireless transceiver and a wireline transceiver.

27. A computer-readable medium encoded with a set of instructions, the instructions comprising:
at least one instruction for receiving information concerning a timing requirement for a software command from a processor where the timing requirement is dependent on a system time;

at least one instruction for determining the system time;
at least one instruction for determining a sync signal from the system time;
at least one instruction for coupling the sync signal to an interface to initiate the software command;
at least one instruction for determining whether the timing requirement has been met based on the system time and the sync signal; and
at least one instruction for selectively allowing transmission of the software command from the processor to the hardware circuit when the timing requirement has been met.

\* \* \* \* \*

UNITED STATES PATENT AND TRADEMARK OFFICE
CERTIFICATE OF CORRECTION

| | | |
|---|---|---|
| PATENT NO. | : 7,661,009 B2 | |
| APPLICATION NO. | : 11/398061 | |
| DATED | : February 9, 2010 | |
| INVENTOR(S) | : Tadeusz Jarosinski | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 544 days.

Signed and Sealed this

Twenty-eighth Day of December, 2010

David J. Kappos
*Director of the United States Patent and Trademark Office*